United States Patent
Kamran et al.

(10) Patent No.: US 12,405,729 B2
(45) Date of Patent: Sep. 2, 2025

(54) LOG-STRUCTURED DATA STORAGE SYSTEM USING FLEXIBLE DATA PLACEMENT FOR REDUCED WRITE AMPLIFICATION AND DEVICE WEAR

(71) Applicant: Dell Products L.P., Round Rock, TX (US)

(72) Inventors: Lior Kamran, Richon LeZion (IL); Uri Shabi, Tel Mond (IL); Steven A. Morley, Mendon, MA (US); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 18/237,982

(22) Filed: Aug. 25, 2023

(65) Prior Publication Data

US 2025/0068330 A1    Feb. 27, 2025

(51) Int. Cl.
*G06F 3/06* (2006.01)
*G06F 12/02* (2006.01)

(52) U.S. Cl.
CPC .......... *G06F 3/0616* (2013.01); *G06F 3/0608* (2013.01); *G06F 3/0644* (2013.01); *G06F 3/0652* (2013.01); *G06F 3/0688* (2013.01); *G06F 12/0253* (2013.01); *G06F 2212/262* (2013.01)

(58) Field of Classification Search
CPC ............. G06F 2212/262; G06F 3/0616; G06F 3/0608; G06F 3/0644; G06F 3/0652; G06F 3/0688; G06F 12/0253
See application file for complete search history.

(56) References Cited

U.S. PATENT DOCUMENTS

| | | | |
|---|---|---|---|
| 7,945,752 B1* | 5/2011 | Miller | G06F 3/0611 711/E12.008 |
| 8,959,280 B2 | 2/2015 | Yu et al. | |
| 9,547,589 B2 | 1/2017 | Yu et al. | |
| 11,513,951 B2 | 11/2022 | Alkalay et al. | |
| 2003/0023818 A1* | 1/2003 | Archibald, Jr. | G06F 3/061 711/114 |
| 2008/0144450 A1 | 6/2008 | Chen | |
| 2011/0283048 A1 | 11/2011 | Feldman et al. | |

(Continued)

*Primary Examiner* — Reginald G Bragdon
*Assistant Examiner* — Zakaria Mohammed Belkhayat
(74) *Attorney, Agent, or Firm* — BainwoodHuang (57) ABSTRACT

System-level garbage collection is performed in an SSD-based data storage system employing log-structured writing of data. Respective reclaim unit sizes of the storage devices are identified, wherein each reclaim unit is a unit of programming and erasure used by device-level garbage collection to generate erased reclaim units for allocation for physical data storage. The data is arranged across the storage devices in first and second data units, each first data unit being of a first size U equal to the product of R and a stripe width W, each second data unit including a respective set of first data units which occupy a maximum-size reclaim unit of a storage device among those storing the first data units. The system-level garbage collection is operated with second-data-unit granularity to regularly generate empty second data units for allocation in the log-structured writing of data, reducing write amplification and device wear.

21 Claims, 3 Drawing Sheets

(56) References Cited

U.S. PATENT DOCUMENTS

| | | | |
|---|---|---|---|
| 2015/0205669 A1* | 7/2015 | Sundaram | G06F 11/1092 |
| | | | 714/6.23 |
| 2016/0179410 A1* | 6/2016 | Haas | G06F 3/0655 |
| | | | 714/6.24 |
| 2016/0196216 A1 | 7/2016 | Lee | |
| 2018/0095906 A1* | 4/2018 | Doshi | G06F 12/1027 |
| 2020/0133492 A1* | 4/2020 | Bernat | G06F 3/0689 |

* cited by examiner

LOG-STRUCTURED DATA STORAGE SYSTEM USING FLEXIBLE DATA PLACEMENT FOR REDUCED WRITE AMPLIFICATION AND DEVICE WEAR

BACKGROUND

The invention is related to the field of data storage systems, and in particular to solid-state drive (SSD)-based data storage systems employing log-structured writing of data with associated system-level log consolidation or "garbage collection".

SUMMARY

A method is disclosed of performing system-level garbage collection in a data storage system employing log-structured writing of data, wherein the data storage system includes a set of solid-state drive (SSD) storage devices providing underlying physical storage for the data. The method includes identifying respective reclaim unit sizes of the storage devices, each storage device having reclaim units of the respective size, each reclaim unit being a unit of programming and erasure used by device-level garbage collection to regularly generate erased reclaim units for allocation for physical data storage. The reclaim unit sizes are respective power-of-2 multiples of a base reclaim unit size R. The method further includes arranging the data across the physical storage devices in first and second data units, each first data unit being of a first size U equal to the product of R and a stripe width W of storage devices across which the first data unit extends, each second data unit including a respective set of first data units which occupy a maximum-size reclaim unit of a respective storage device among the storage devices across which the set of first data units extend. The system-level garbage collection is operated with second-data-unit granularity to regularly generate empty second data units for allocation in the log-structured writing of data. Benefits can include reduced write amplification and device wear of the SSD storage devices.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

An example is described in which a data storage system includes storage nodes which generally consist of CPU, Memory and a DAE (Disk Array Enclosure) with solid-state drive (SSD) drives as the backend. The storage system uses a redundant array of independent disks (RAID) parity protection scheme (e.g., RAID 5 or RAID 6) to store user data. In particular, a mapped RAID technique is used with data organized in grids of fixed size blocks called "ubers", with R rows and K+1 (RAID 5) or K+2 (RAID 6) columns. Each column is stored on a separate physical drive, and one (RAID 5) or two (RAID 6) columns are designated as parity. For RAID 6 for example, each uber is constructed with a subset of K+2 drives (out of total N drives in the DAE); different ubers may have different K+2 drives.

An uber contains fixed capacity (e.g., 64 GB) of user data (excluding parity), and is constructed with fixed size slices of (e.g., 4 GB). Referring to the above example, an uber with 4+2 (K=4) drives has four slices on each drive (4 slices of 4 GB×4 drives=4×4×4=64 GB of user data), while the total uber capacity is 96 GB (including the 2 parity drives). In known arrangements each line in the uber is called a PLB (Physical Large Block) containing 2 MB of compressed user data. The 2 MB is split between four drives with each storing 512 KB, and each parity drive stores 512 KB of parity, which means each line stores a total of 3 MB.

The storage system uses log-structured writes for the user data. In the case of PLB granularity, the system always writes full PLBs. When a data block within an existing PLB is overwritten, the new data is written (together with more new data) to a new (empty) PLB. An existing PLB which holds existing data is not modified—updated blocks are marked as invalid. The system uses a Garbage Collection (GC) process which merges partially utilized PLBs and writes them to a new PLB, freeing the old PLBs. As a result, free PLBs become randomly located in the drives, and therefore the storage system randomly writes to the SSDs.

The random-write performance of SSDS is much lower than sequential writes. The reason is that the SSD writes data in "erase block" units, which must be completely erased before they can be rewritten. Overwrites of data within an erase block always go to new erase block. When the overwrites leave holes, the drive has much more load to free full erase blocks that can be erased and reused, as it needs to move data from one block to others (i.e., device-level Garbage Collection), which means performing more Read and Writes.

Excessive device-level GC can cause not only performance degradation, but also accelerated wear of the SSD. The SSD supports a limited number of P/E (Program/Erase) cycles for each erase block; therefore, the more GC is performed, the WA (Write Amplification) is increased, and the SSD needs to rewrite (P/E) more erase blocks. The wear problem is especially significant with so-called quad level cell (QLC) drives, in which the number of P/E cycles are much more limited than other types such as tri-level cell (TLC) drives. As QLC drives become more cost-effective with higher capacities, there is a need to find solutions to the GC-related performance and wear problems to enable such devices to attain widespread use in data storage systems.

In one aspect the disclosed technique can utilize a new technology known as Flexible Data Placement (FDP) drives. These drives define a Reclaim Unit (RU) which is a unit of storage within the SSD. The drive physical capacity is divided to multiple (fixed size) RUs, and the host or controller is provided with additional/modified NVMe commands that allow it to direct data to different RUs, as well as to erase a complete RU. Optimally, the host would fill and erase RUs without requiring the SSD to perform any device-level GC, which would yield a device write amplification of 1.

Transitioning a data storage system to support FDP drives may not be straightforward, due to the fact that it is generally desired to support drives with different RU sizes. Data storage systems generally support a dynamically changing population of physical storage devices over an extended period of operation—drives may be added, replaced, etc. Drives that are newer or from different vendors may have different RU sizes from those currently in the system. As an example, some SSD vendors plan to increase RU size by factors of 2 as device storage density increases over time. This heterogeneity presents a challenge due to the system's use of ubers that span across multiple drives, which in general may have different (and dynamically changing) RU sizes over an extended period of system operation.

In one key aspect, the disclosed technique proposes to shift system-level GC to using a larger unit referred to as a "super uber", which is a set of multiple ubers. There are multiple beneficial effects. First, the larger size corresponds to the large size of the RUs used by the SSDs, so that system level GC avoids the write amplification problem associated with smaller data units such as PLBs. Second, the use of a flexible-size unit (super uber) enables the system GC to accommodate a set of drives having variable RU sizes while still retaining RU granularity, helping to reduce the need for device-level GC. Finally, different super ubers are permitted to be of different sizes based on the location of uber segments on the drives of the system, so that any inefficiencies arising from using very large units of GC are minimized.

More particularly, a disclosed approach addresses the described problems under the assumption that all the SSD drives in the system have a RU size that is a power-of-2 multiple of the minimum RU size. SSD drives that support FDP are used in a certain way, based in part on setting uber capacity within each drive to a basic (i.e., minimal) RU size, which is referred to as RU_base. The storage system GC shifts from PLB granularity to "super uber" granularity (i.e., sets of multiple ubers, described in detail below), such that GC empties an entire super uber and then erases each uber section on each of the drives it occupies. As a result, the corresponding RUs on each of the drives are fully erased, such that there is no need for the SSD to perform GC.

Each super uber is composed of n ubers which is the number of ubers that can be placed in the largest RU among the uber subset of drives (i.e., the set of drives on which the uber's data is stored). For example, if the largest RU among the uber drives is two, then the super uber is composed of two ubers. Similarly, if the largest RU among the uber drives is four, then the super uber is composed of four ubers. Different super ubers may have different numbers of ubers.

Ubers and super ubers are created at various points of system operations. For example, when one or more new drives are added, the system initiates a "Restripe" process, which may modify the uber subset of drives for some set of ubers. For example, it may replace drive Di of uber_a with newly inserted drive Dt, such that the uber data located on drive Di is copied to drive Dt. If the maximum RU size across the set of uber drives has changed, then new super ubers are formed for each affected uber. For example, if the previous max RU has base size R and the new max RU size has size 2R, then the super uber size of all ubers occupying the new drive is increased to two ubers. This ensures that system GC erases 2R-size units.

When a drive fails, the system initiates a "Rebuild" process, which, similar to "Restripe", may modify uber subset of drives. For example, it may replace a failed drive Di of uber_a with drive Dt, and then reconstruct the uber data located on drive Di using parity, and write it to drive Dt. The same rules of "Restripe" for super uber creation/modification apply also to "Rebuild". The restripe process includes data movement which has a wear cost; however, this happens only once when drives are added/removed, whereas the write amplification improvement is ongoing over an extended device lifetime (e.g., on the order of 5 years).

Any non-log-structured data, such as the metadata, may be segregated from the log-structured user data by writing them to separate RUs that are not mixed with user data RUs. Metadata may continue to be written without super uber organization, but preferably to the separate RUs using appropriate protocol (e.g., NVMe) commands.

The proposed solution enables the storage system to utilize FDP drives in a way that improves performance and reduces write amplification, while still providing the flexibility to add newer drives with larger RU sizes.

EMBODIMENTS

Figure 1:
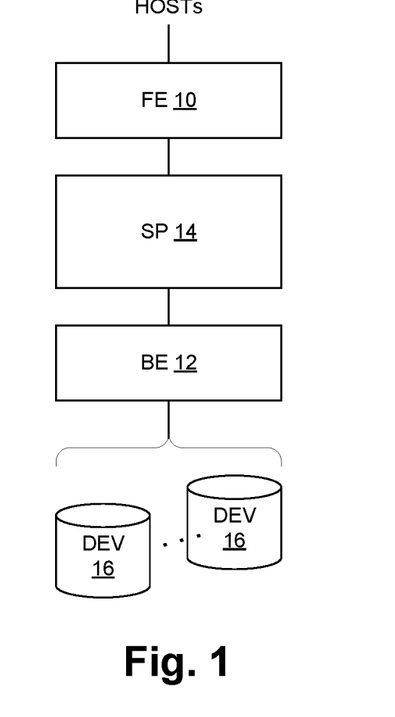
FIG. 1 is a block diagram of a data storage system.

FIG. 1 shows a data storage system as including front-end interface circuitry (FE) 10, back-end interface circuitry (BE) 12, storage processing circuitry (SP) 14, and an array of physical storage devices (DEV) 16, which as described below are realized as so-called "solid-state drives" (SSDs) based on flash-programmable memory technology ("Flash"). The FE 10 provides an interface to separate data storage clients indicated as "hosts", while the BE 12 interfaces the SP 14 to the devices 16. As generally known, the SP 14 is a computerized subsystem including processors, memory, and I/O interface circuitry collectively storing and executing computer program instructions to realize a variety of data storage functionality such as storing and retrieving host data to/from the devices 16 in response to host commands. The present description focuses on particular aspects of storage functionality, namely the use of log-structured writes and associated reclaim (garbage collection) in connection with flash-based physical storage such as described in the Overview above.

Figure 2:
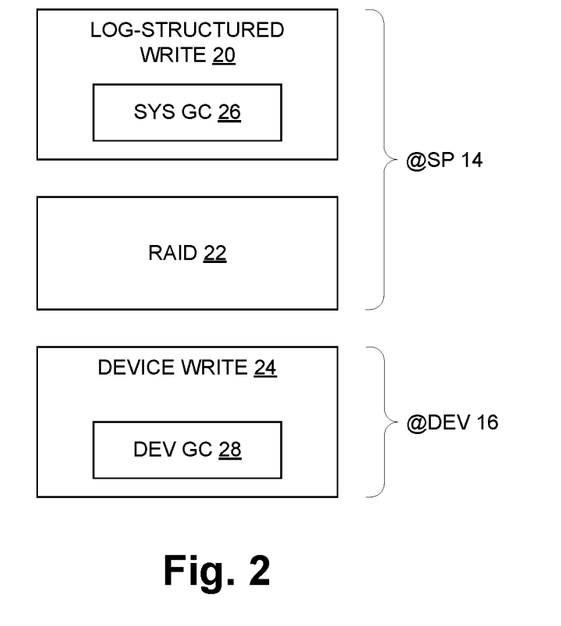
FIG. 2 is a functional block diagram of relevant components of a data storage system.

FIG. 2 is a functional diagram of the data storage system in relevant part. It includes a log-structured write component 20 and a RAID component 22 realized by the SP 14 executing corresponding sets of computer program instructions, as well as device write components 24 contained in respective devices 16. In this description the singular term "device write component" may be used in some places to refer to a set of device write components of multiple drives that may be operating in parallel.

The log-structured write component 20 operates as outlined above, i.e., it performs requested write operations into a large write log that is persisted to the devices 16, in a manner generally known in the art. As part of its operation it includes a system-level garbage collection component (SYS GC) 26 that is responsible for regularly processing stored data for consolidation and freeing of empty data units for new writes. In the description below, a specific example is used in which these data units are labeled as "super ubers", where an "uber" is a data unit used by the RAID component 22 in the RAID structuring of data on the devices 16.

The device write component 24 also performs a type of reclaim or garbage collection at the device level, which is shown as device garbage collection (DEV GC) 28. As generally known, SSD devices write data in a manner that is somewhat analogous to log-structured writing, which arises from the technical nature of the devices. In SSD devices, a storage cell can be written with new data only after first being erased, i.e., set to a known initial condition. Moreover, erasure is performed on large units called "erase blocks". Overwrites of data cause allocation of a new erase block. The device-level garbage collection component 28 operates to consolidate stored data and free up erase blocks for erasure and reuse. As outlined above, a goal of the present technique is to better align system-level operation with device-level operation to reduce write amplification and associated device wear.

Figure 3:
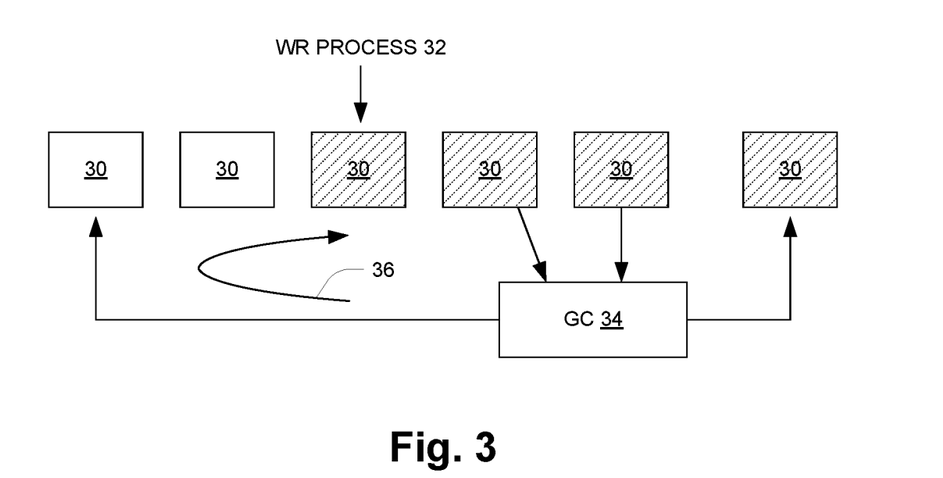
FIG. 3 is a simplified schematic depiction of garbage collection.

FIG. 3 provides a simplified view of garbage collection generally. It operates on data units 30 of size(s) appropriate to the application. In FIG. 3, the units 30 are shown as shaded if they contain at least some valid data, and unshaded if completely empty/erased. Also shown are a write process 32 and garbage collection (GC) process 34, as well as an arrow 36 illustrating a general direction of flow of overall operation. Data units 30 originate as empty or erased (at left) and in time become allocated for use by the write process 32 to store data. The write process 32 regularly switches to using a new unit 32, leaving populated units 30 in storage. In time these become candidates for garbage collection 34, which operates (1) to consolidate data of multiple units 30 into consolidated units 30 (right arrow from GC 34), and (2) as a product of the consolidation process, produce empty units 30 that are made available for reuse (left arrow from GC 34).

Figure 4:
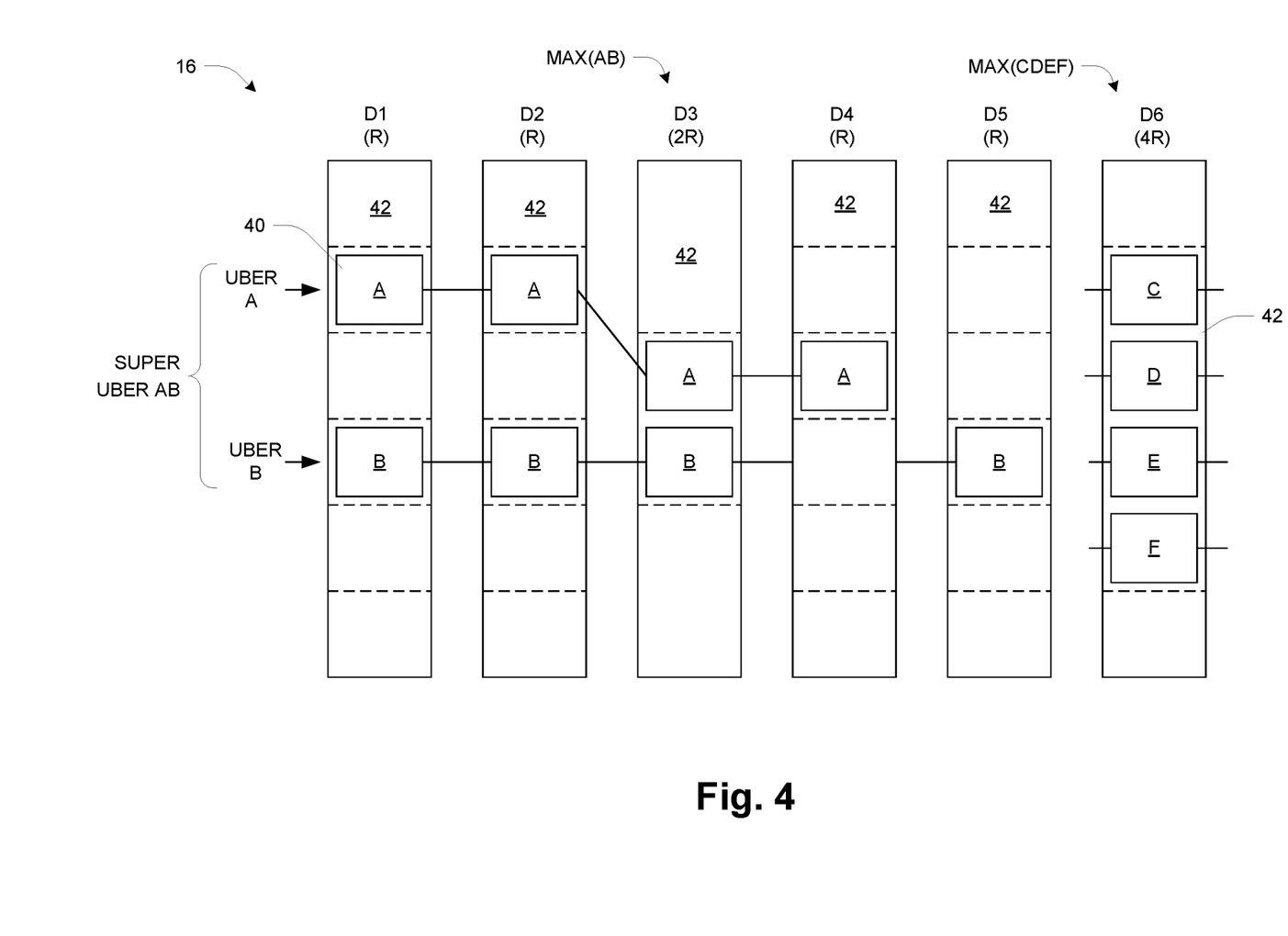
FIG. 4 is a schematic diagram of data structuring across a set of storage devices in accordance with mapped RAID techniques and garbage collection functionality.

FIG. 4 depicts a certain arrangement of data on an example set of devices 16 shown as D1-D6 (along with an indication of reclaim unit sizes, explained below). This is a simplified example of mapped RAID storage provided by the RAID component 22 of FIG. 2. In this example data is first organized into large units called "ubers" that are striped across respective sets of drives 16, in this case sets of four drives 16. In practice an uber contains both user data and associated parity data in accordance with the RAID scheme, and these are striped in a manner enabling parity-based rebuilding of data segments due to drive failure as generally known in the art. In this simplified example, the data/parity detail is omitted for ease of description, and each of the 4 drives for a given uber is shown as storing a respective segment 40 which is ¼ of the uber data. Thus if the uber has a size of 64 GB, for example, then each of the uber's drives 16 stores a 16-GB segment 40 of that uber. In FIG. 4, the segments 40 are shown as solid squares labelled with their uber label A, B, . . . F. Ubers A and B are depicted completely, with uber A occupying drives D1-D4 and uber B occupying drives D1-D3 and D5. FIG. 4 also shows that drive D6 stores segments of other ubers C-F, for which the other segments (stored on other drives) are omitted for clarity of the drawing.

FIG. 4 also includes dashed-line indications for the boundaries of erase blocks 42 of the drives 16, which are referred to as "reclaim units" or RUs herein (note only selected instances are numbered). Reclaim-unit functionality is a feature of so-called "flexible data placement" (FDP) drives, which expose their erase blocks as reclaim units to enable a drive user (e.g., RAID 22 and other components of SP 14) to control the placement of data at the device level and thus influence the manner in which device GC 28 is performed. Reclaim units are explicitly identified using an identifier known as a "handle" in certain storage protocols such as NVMe. In the present context, this data placement control is used to align uber segments 40 with erase blocks 42 for improved GC functionality, as explained further below.

In the example of FIG. 4, drives D1-D2 and D4-D5 all have RU size equal to the uber segment size, which is referred to as a "base" reclaim unit size R. Drive D3 has a reclaim unit size of 2*R (or 2R), and drive D6 has a reclaim unit size of 4*R (4R). Within each drive 16, the reclaim unit is the unit of erasure and reallocation by the drive GC 28, as explained above. As shown, the segments 40 of ubers A and B on drive D3 occupy the same 2R-size reclaim unit 42. Also, the segments 40 of ubers C, D, E and F all occupy the same 4R-size reclaim unit 42 of drive D6. The 2-uber set (A, B) is shown as super uber AB, and it will be appreciated that there is also a super uber CDEF for ubers C-F, which is not depicted. Drive D3 is also indicated as Max(AB), and drive D6 is indicated as Max(CDEF), which is explained below.

As illustrated by the example of FIG. 4, the drives 16 are generally heterogeneous in terms of reclaim unit size. This heterogeneity may arise due to use of devices 16 of different types or brands, for example, or it may be generational—a newer drive 16 may provide more storage capacity and utilize a larger RU size than a previous generation. It is assumed herein that the population of drives 16 in a system is somewhat dynamic, i.e., drives 16 may be removed, moved, or added for a variety of reasons including expansion, failure recovery, etc. This dynamic heterogeneity gives rise to a need for the presently disclosed technique, which is to adaptively accommodate a changing drive population while maintaining desired data organization for GC purposes, as explained in more detail below. The technique is based in part on identifying the largest reclaim unit size among of set of drives 16 that stores a set of ubers. In the example of FIG. 4, drive D3 is indicated as Max(AB) because its RU size of 2R is the greatest among the set of drives D1-D5 that store ubers A and B. Similarly it is assumed that the RU size of 4R of drive D6 is the greatest among the set of drives that store ubers C-F.

Figure 5:
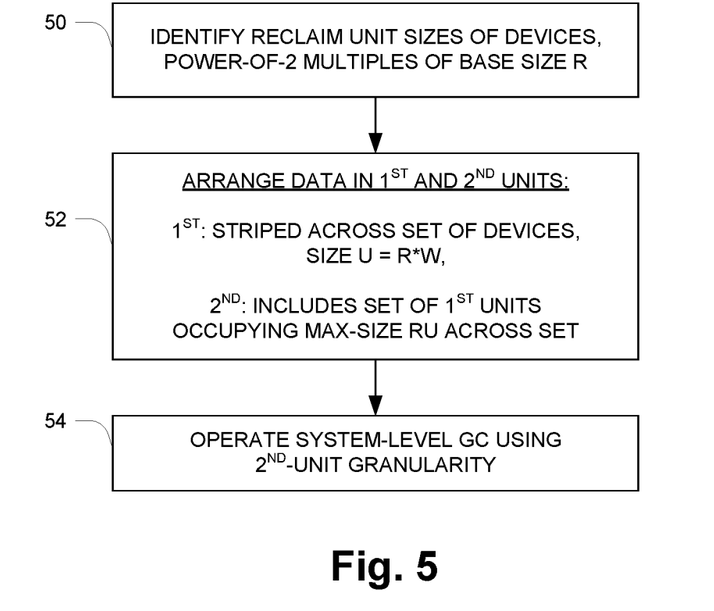
FIG. 5 is a flow diagram depicting key aspects of garbage collection functionality of the data storage system.

FIG. 5 illustrates a core aspect of system operation as it relates to garbage collection and associated data structuring. Generally this is a method of performing system-level garbage collection in a data storage system employing log-structured writing of data, where the data storage system includes a set of physical storage devices providing underlying physical storage for the data. In an embodiment such as described herein, the process may be performed by collaboration among functional components such as the components 20 and 22 of SP 14.

At 50, operation includes identifying respective reclaim unit sizes of the storage devices, wherein each storage device has reclaim units of the respective size. As noted, each reclaim unit is a unit of programming and erasure used by device-level garbage collection (e.g., 28) to regularly generate erased reclaim units for allocation for physical data storage. For reasons explained further below, the reclaim unit sizes are limited to respective power-of-2 multiples of a base reclaim unit size R (i.e., 2R, 4R, . . . ).

At 52, the data is arranged across the physical storage devices in first and second data units. Each first data unit (corresponding to an uber in the example) is of a first size U equal to the product of R and a stripe width W of storage devices across which the first data unit extends (e.g., W=4 in the example). Each second data unit (corresponding to a super uber in the example) includes a respective set of first data units which occupy a maximum-size reclaim unit of a respective storage device among the storage devices across which the set of first data units extend. Applying this to the example, the ubers A and B extend across drives D1-D5, and of these, drive D3 has the largest reclaim unit size (with one RU including segments for both A and B). Thus super uber AB has ubers A and B which both have segments stored on drive D3.

At 54, the system-level garbage collection operates with second-data-unit granularity to regularly generate empty second data units for allocation in the log-structured writing of data. Thus the system GC (e.g., 26) has knowledge of the $2^{nd}$ data units (e.g., super ubers) of the data arrangement, so that it can manipulate them for garbage collection as generally known. As an example, system-level GC may operate on super uber AB to consolidate its data with the data of some other super uber and thereby completely empty super uber AB so it is available for reuse. Once this has occurred, all of the associated RUs 42 of devices 16 can be erased and marked for reuse by the device-level GC 28. It will be appreciated that the device-level GC 28 thus preforms no data consolidation of its own for such RUs, but rather it performs only whole-RU erasures and recycling, which reduces device wear and improves device lifetime. It should also be noted that if system level GC were to operate on smaller units such as ubers, then this device-level effect would not be achieved for all devices 16 having larger RU sizes (such as D3 and D6 in the example). By using the larger super uber as the unit of GC, it ensures that only whole RUs are erased and recycled as part of system level GC.

The above also explains the power-of-2 limitation on RU size. More generally, the max RU size needs to be the least common multiple (LCM) of all possible other RU sizes, so that basing the $2^{nd}$ unit size on the max RU size ensures that each $2^{nd}$ unit includes only whole RUs on every drive it occupies. As a practical matter, powers of 2 meet this LCM requirement in a desirably minimal way (i.e., minimizing the overall size of the $2^{nd}$ units to avoid inefficiencies that may be caused by using larger units).

Referring again to FIG. 4, the following may also be appreciated:
1. A super uber which contains an uber that is constructed with a drive Di that has RU larger than the basic RU (i.e., RU_size=m*RU_base, m power of 2), must include additional (m−1) ubers with the same drive Di. Otherwise, emptying the super uber by the GC won't empty the RU on drive Di.
2. For example, referring to FIG. 4, the super uber AB contains uber A, which occupies a drive D3 that has RU_size=2*RU_base. This means that the this super uber must contain another uber (e.g., uber B) that occupies the same drive D3. Note that the RAID component 22 uses the RU functionality of the protocol (e.g., an RU handle) to control that the D3 segments for uber A and uber B are stored in the same RU.

Figure 6:
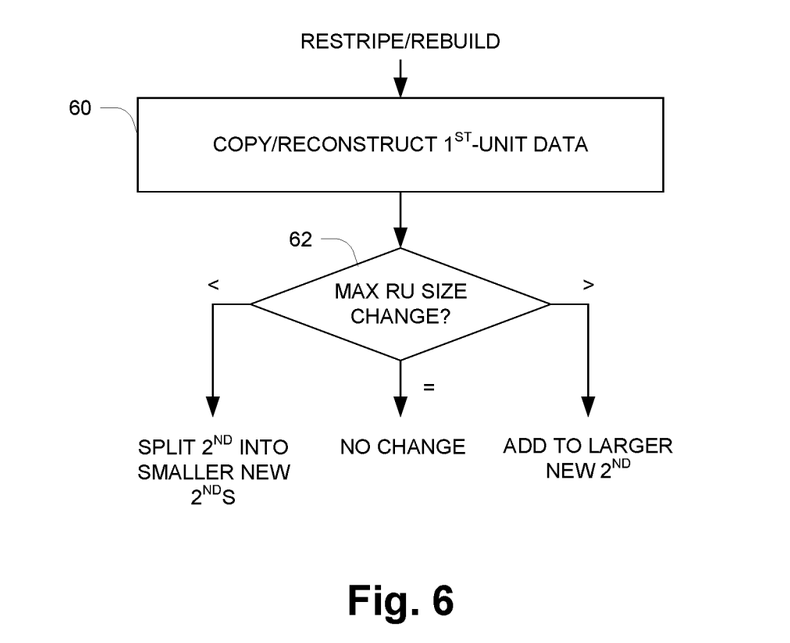
FIG. 6 is a flow diagram depicting operations in connection with restriping/rebuilding in the data storage system.

FIG. 6 illustrates aspects of restripe/rebuild as mentioned above. This can occur under a variety of circumstances such as addition of a new drive (with associated shuffling of stored data for balancing), replacement of a drive, etc.

At 60, the RAID component 22 operates to copy or reconstruct data of the $1^{st}$ data units (e.g., ubers) as necessary. In the case of data shuffling or migration, this may require only copying a segment 40 of the uber to the new drive. In the case of replacement of a failed drive, it may require reconstructing the segment 40 from the remaining uber segments 40, as generally known. This copying or reconstructing is performed for a set of ubers as needed (e.g., for at least all ubers occupying a failed drive, etc.).

At 62, for each uber it is determined whether the maximum RU size for its set of drives has changed, such that the associated super uber may need restructuring. Three cases are depicted:
"=" (no change): super uber remains as-is
">" (max RU size has increased): uber is incorporated into new super uber of appropriate larger size (e.g., if max size is 2× previous, then new 2×-size super uber created)
"<" (max RU size has decreased): super uber is split into appropriate number of smaller super ubers (e.g., if max size is ½ of previous, then split into 2 new super ubers)

The above cases can be appreciated with reference to the example of FIG. 4. The =case is trivial and not elaborated (new drive is same as original drive). An example of the ">" case would be to replace drive D3 by a drive like D6 having a 4R reclaim unit size. Ubers A and B are incorporated into a new 4-uber super uber, along with two other ubers having segments on drive D3 (note that this may change the makeup of the set of drives). An example of the "<" case would be that drive D6 is replaced by a drive like D3 having a 2R reclaim unit size. Ubers C-F are then divided into two new super ubers, each containing 2 ubers, which will continue to populate the same set of drives.

While various embodiments of the invention have been particularly shown and described, it will be understood by those skilled in the art that various changes in form and details may be made therein without departing from the scope of the invention as defined by the appended claims.

What is claimed is:

1. A method of performing system-level garbage collection in a data storage system employing log-structured writing of data, the data storage system including a set of solid-state drive (SSD) storage devices providing underlying physical storage for the data, comprising:
 identifying respective reclaim unit sizes of the storage devices, each storage device having reclaim units of the respective size, each reclaim unit being a unit of programming and erasure used by device-level garbage collection to regularly generate erased reclaim units for allocation for physical data storage, the reclaim unit sizes being respective power-of-2 multiples of a base reclaim unit size R;
 arranging the data across the physical storage devices in first and second data units, each first data unit being of a first size U equal to the product of R and a stripe width W of storage devices across which the first data unit extends, each second data unit including a respective set of first data units which occupy a maximum-size reclaim unit of a respective storage device among the storage devices across which the set of first data units extend; and
 operating the system-level garbage collection with second-data-unit granularity to regularly generate empty second data units for allocation in the log-structured writing of data.

2. The method of claim 1, wherein the first data units are extents arranged in accordance with a mapped RAID scheme in which each data unit includes a first number of segments of user data and a second number of segments of parity data, each segment being stored on a respective different storage device, different ones of the first data units occupying respective different sets of the storage devices.

3. The method of claim 1, wherein the second data units are of generally different sizes based on respective maximum-size reclaim units for respective sets of the storage devices across which the respective sets of first data units of each second data unit extend.

4. The method of claim 1, wherein the storage devices are flexible data placement devices each providing for external control of data placement among the reclaim units of the storage device, and wherein arranging the data includes exercising the external control to locate segments of first data units of a given second data unit together in a reclaim unit of a storage device.

5. The method of claim 4, wherein exercising the external control includes using a reclaim unit handle to identify the reclaim unit, the reclaim unit handle being provided by the storage device for use by the external control to identify the reclaim unit when storing data on the storage device.

6. The method of claim 1, further including, as part of a restripe process performed in connection with addition of a new storage device and associated data copying or reconstruction of first-unit data:
  determining whether the first data units of a second data unit occupy a maximum-size reclaim unit of a different size than before the addition of the new storage device;
  based on the size of the maximum-size reclaim unit being increased, then incorporating the first data units into a new second data unit along with other first data units; and
  based on the size of the maximum-size reclaim unit being decreased, then creating a plurality of new second data units and incorporating the first data units into respective ones of the new second data units.

7. The method of claim 6, wherein the addition of the new storage device is for capacity expansion and the data copying is done to reorganize existing data onto an expanded set of storage devices.

8. The method of claim 6, wherein the addition of the new storage device is for failure replacement and the data reconstruction is done to recreate data previously stored on a now failed storage device and store the recreated data on the new storage device.

9. The method of claim 1, wherein at least one of the storage devices has a reclaim unit size equal to the base reclaim unit size R, and for at least one second data unit the corresponding maximum-size reclaim unit is m*R with m greater than or equal to one.

10. The method of claim 1, wherein the smallest reclaim unit size among the storage devices is greater than the base reclaim unit size R, and for at least one second data unit the corresponding maximum-size reclaim unit is greater than or equal to the smallest reclaim unit size.

11. The method of claim 1, wherein the log-structured writing includes, when writing new data for which corresponding existing data is stored in an existing second data unit, (1) invalidating the existing data, and (2) allocating a new second data unit and writing the new data thereto; and wherein the system-level garbage collection includes consolidating valid existing data of the existing second data unit with the new data into a new consolidated second data unit and freeing the existing second data unit for reuse in storing subsequently written data.

12. A data storage system having storage processing circuitry and a set of solid-state drive (SSD) storage devices providing underlying physical storage for the data, the storage processing circuitry being configured and operative to execute computer program instructions to cause the data storage system to perform system-level garbage collection in a manner including:
  identifying respective reclaim unit sizes of the storage devices, each storage device having reclaim units of the respective size, each reclaim unit being a unit of programming and erasure used by device-level garbage collection to regularly generate erased reclaim units for allocation for physical data storage, the reclaim unit sizes being respective power-of-2 multiples of a base reclaim unit size R;
  arranging the data across the physical storage devices in first and second data units, each first data unit being of a first size U equal to the product of R and a stripe width W of storage devices across which the first data unit extends, each second data unit including a respective set of first data units which occupy a maximum-size reclaim unit of a respective storage device among the storage devices across which the set of first data units extend; and
  operating the system-level garbage collection with second-data-unit granularity to regularly generate empty second data units for allocation in the log-structured writing of data.

13. The data storage system of claim 12, wherein the first data units are extents arranged in accordance with a mapped RAID scheme in which each data unit includes a first number of segments of user data and a second number of segments of parity data, each segment being stored on a respective different storage device, different ones of the first data units occupying respective different sets of the storage devices.

14. The data storage system of claim 12, wherein the second data units are of generally different sizes based on respective maximum-size reclaim units for respective sets of the storage devices across which the respective sets of first data units of each second data unit extend.

15. The data storage system of claim 12, wherein the storage devices are flexible data placement devices each providing for external control of data placement among the reclaim units of the storage device, and wherein arranging the data includes exercising the external control to locate segments of first data units of a given second data unit together in a reclaim unit of a storage device.

16. The data storage system of claim 15, wherein exercising the external control includes using a reclaim unit handle to identify the reclaim unit, the reclaim unit handle being provided by the storage device for use by the external control to identify the reclaim unit when storing data on the storage device.

17. The data storage system of claim 12, wherein the execution of the computer program instructions further causes the data storage system, as part of a restripe process performed in connection with addition of a new storage device and associated data copying or reconstruction of first-unit data, to:
  determine whether the first data units of a second data unit occupy a maximum-size reclaim unit of a different size than before the addition of the new storage device;
  based on the size of the maximum-size reclaim unit being increased, then incorporate the first data units into a new second data unit along with other first data units; and
  based on the size of the maximum-size reclaim unit being decreased, then create a plurality of new second data units and incorporating the first data units into respective ones of the new second data units.

18. The data storage system of claim 17, wherein the addition of the new storage device is for capacity expansion and the data copying is done to reorganize existing data onto an expanded set of storage devices.

19. The data storage system of claim 17, wherein the addition of the new storage device is for failure replacement and the data reconstruction is done to recreate data previously stored on a now failed storage device and store the recreated data on the new storage device.

20. The data storage system of claim 12, wherein at least one of the storage devices has a reclaim unit size equal to the base reclaim unit size R, and for at least one second data unit the corresponding maximum-size reclaim unit is m*R with m greater than or equal to one.

21. The data storage system of claim 12, wherein the smallest reclaim unit size among the storage devices is greater than the base reclaim unit size R, and for at least one second data unit the corresponding maximum-size reclaim unit is greater than or equal to the smallest reclaim unit size.

* * * * *